May 28, 1968   J. L. CULLEN   3,385,405
DRUM BRAKE SUPPORT

Filed Nov. 8, 1966   2 Sheets-Sheet 1

United States Patent Office 3,385,405
Patented May 28, 1968

3,385,405
DRUM BRAKE SUPPORT
John Leslie Cullen, Tyseley, Birmingham, England,
assignor to Girling Limited
Filed Nov. 8, 1966, Ser. No. 592,856
5 Claims. (Cl. 188—206)

This invention relates to drum brakes, and provides a new and improved construction of support structures upon which the brake elements are mounted.

In accordance with a feature of the invention, a support structure for a drum brake comprises two plates secured together face to face over an inner zone, and secured together over an outer zone, the plates being so shaped relative to each other that they are spaced apart over a zone intermediate the inner and outer zones.

Such a construction can be very strong for its weight.

The plates are preferably additionally secured together by one or more tie members extending between two plates in the above-mentioned intermediate zone, and the (or each) tie member may be tubular and capable of accommodating an element of the brake mechanism such as an anchor pin or a camshaft.

One form of support structure in accordance with the invention and modification will now be described, by way of example only, with reference to the accompanying drawings, in which.

Figure 1:
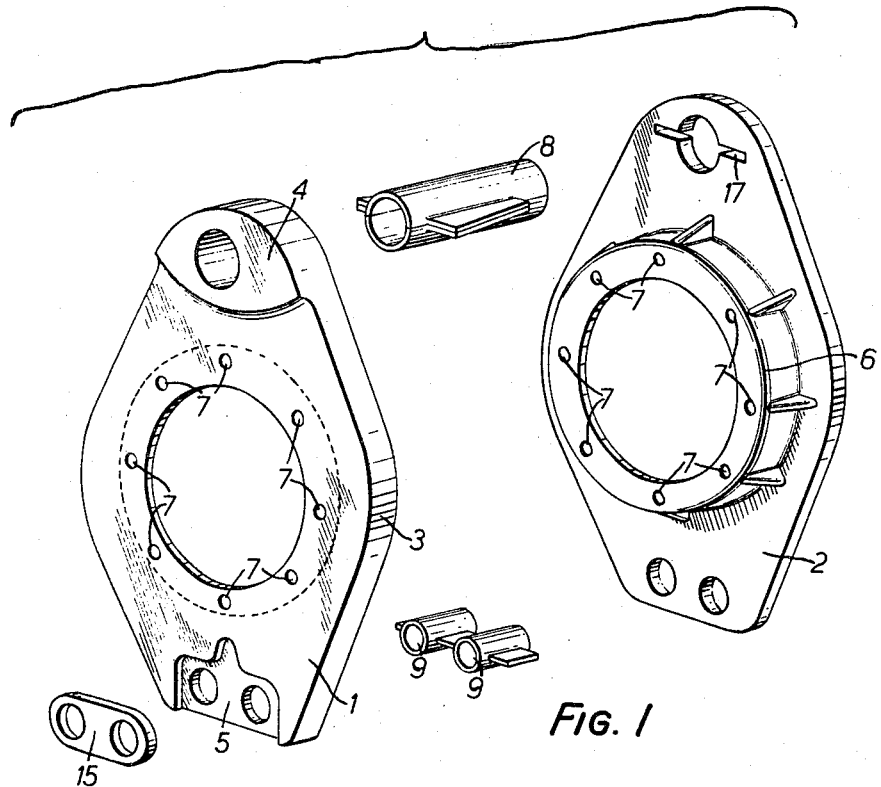
FIGURE 1 is an exploded perspective view of the components of the structure.
Figure 2:
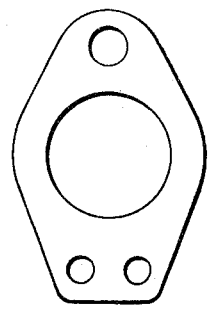
FIGURE 2 is a sketch, to a smaller scale, indicating areas over which the two plates may be welded together.
Figure 3:
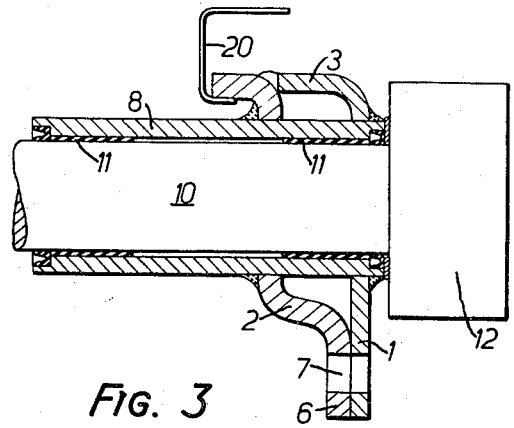
Figure 4:
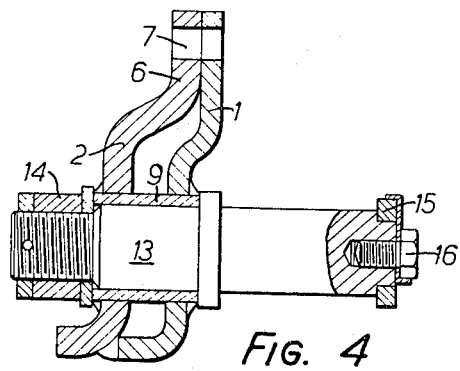
Figure 5:
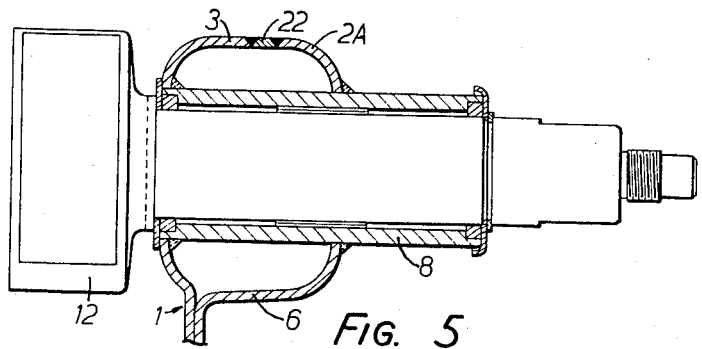
Figure 6:
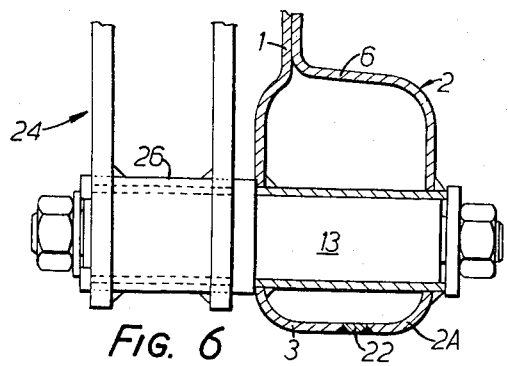

FIGURES 3 and 4 are transverse sections, to a larger scale of the upper and lower portions, respectively, of the structure, and FIGURES 5 and 6 are views, similar to FIGURES 3 and 4, of a modified structure.

The structure comprises two steel pressings 1 and 2, of which the front pressing 1 is formed with a peripheral flange 3 and offset portions 4 and 5, and the rear pressing 2 is formed with a flanged boss 6. The two plates are secured together along an outer zone by seam welding at their peripheries, and at an inner zone by the bolts which secure the structure to an axle housing flange, the bolts passing through holes 7 surrounding the central apertures of the plates. Intermediate these zones the plates are spaced apart, and are additionally secured together by tie members in the form of tubes 8, 9 welded at their ends in holes in the respective plates.

The tubes are open at their ends to receive elements of the brake mechanism. Thus, the top tube 8 receives a camshaft 10 which is journalled in plain bearings 11, e.g. of plastics material, and which carries at its inner end a brake operating cam 12, and the two lower tubes 9 each receive an anchor pin 13 secured in the tube by a nut 14. A retaining plate 15 is removably secured to the inner ends of the anchor pins 13 by bolts 16. The spacing between the plate 15 and co-operating shoulders on the pins 13 is sufficient to accommodate brake shoes whose width is increased by reinforcing webs thereon.

The structure is completed by a dirt shield 20 secured to the rear pressing 2.

The tubes 8 and 9 may be of fabricated construction, for example the tube 8 may consists of two half pressings having diametrically opposed outer flanges which are welded together, and which may be received in radial slots 17 extending from the hole in the rear pressing 2 which receives the tube. In cutting the pressings blanks from sheet material can be saved by inclining the edges of the webs. The two lower tubes 9 can similarly be formed from half pressings, each having a pair of semi-circular recesses, distinct to form half tubes, connected integrally by a web. The webs, and integral, outwardly projecting reinforcing flanges, can be welded to the plates 1 and 2 for greater rigidity.

With the above described construction, the support structure is given great strength and rigidity for its weight. The plates 1 and 2 may be of different thicknesses, say ⅜" and ¼", or ⅛" and ¼", or may be of equal thickness, say ⅛".

The modified structure shown in FIGURES 5 and 6 is generally similar to that described above, the main difference being that the rear pressing 2 has a peripheral flange 2A extending towards and welded to the flange 3 of the pressing 1. Fabrication is assisted by the use of narrow fillets 22 inserted locally between the flanges 2A and 3. FIGURE 6 also shows a brake shoe 24 mounted on the anchor pin 13, the shoe being of channel cross section with a bush 26 welded between its webs.

I claim:

1. In or for a drum brake, a support structure comprising two plates each having an inner zone and an outer zone, means securing said two plates together over said outer zone, means securing said two plates together in face-to-face contact over said inner zone, mounting means for other elements of said brake, and means spacing said plates apart in a zone intermediate said inner and outer zones.

2. A support structure as claimed in claim 1, wherein one of said plates has a peripheral flange secured to the periphery of the other of said plates, one of said plates has an inner, raised boss secured to the other of said plates, and said flange and boss together define said intermediate zone.

3. A support structure as claimed in claim 1, further comprising tie means extending between said plates in said intermediate zone and securing said plates together.

4. A support structure as claimed in claim 3, wherein said tie means consists of at least one open ended tubular member for accommodating a further element of said drum brake.

5. A support structure as claimed in claim 4, wherein said tie means consists of a first tubular member for accommodating a brake operating camshaft, and second and third tubular members for accommodating respective anchor pins.

References Cited

FOREIGN PATENTS 609,650  5/1926  France.
1,059,228  11/1953  France.

DUANE A. REGER, *Primary Examiner.*